United States Patent [19]

Mizoguchi et al.

[11] 4,453,230
[45] Jun. 5, 1984

[54] ADDRESS CONVERSION SYSTEM

[75] Inventors: Tetsuya Mizoguchi; Fumitaka Sato, both of Ome; Tadanobu Furukatsu, Tokyo, all of Japan

[73] Assignees: Tokyo Shibaura Electric Co., Ltd., Kawasaki; Nippon Electric Co., Ltd., Tokyo, both of Japan

[21] Appl. No.: 390,783

[22] Filed: Jun. 21, 1982

Related U.S. Application Data

[63] Continuation of Ser. No. 119,653, Feb. 8, 1980, abandoned, which is a continuation of Ser. No. 865,584, Dec. 18, 1977, abandoned.

[51] Int. Cl.³ .............................................. G06F 13/00
[52] U.S. Cl. ............................................................ 364/900
[58] Field of Search .................. 364/200, 900 MS File

[56] References Cited

U.S. PATENT DOCUMENTS

| | | | |
|---|---|---|---|
| 3,825,904 | 7/1974 | Burk | 364/200 |
| 3,902,163 | 8/1975 | Amdahl | 364/200 |
| 3,902,164 | 8/1975 | Kelley | 364/200 |
| 4,053,948 | 10/1977 | Hogan | 364/200 |
| 4,079,453 | 3/1978 | Dahl | 364/200 |

OTHER PUBLICATIONS

IBM Technical Disclosure Bulletin, vol. 19, #2, Jul. 1976, pp. 597-598, Hogan et al.

*Primary Examiner*—James D. Thomas
*Assistant Examiner*—David Y. Eng

[57] ABSTRACT

An address conversion system comprises an improved associative memory circuit for providing a real address corresponding to an applied virtual address with reference to the correspondence between virtual and real addresses stored in a main memory. The associative memory includes first and second memories for storing a part of the correspondence between virtual and real addresses. The second memory is essentially a set associative memory but is not connected with address comparators directly. The first memory is higher in speed but smaller in capacity than the second memory. When the first memory stores the correspondence between the virtual and real address corresponding to the applied virtual address, the real address corresponding to the applied virtual address is immediately delivered.

3 Claims, 9 Drawing Figures

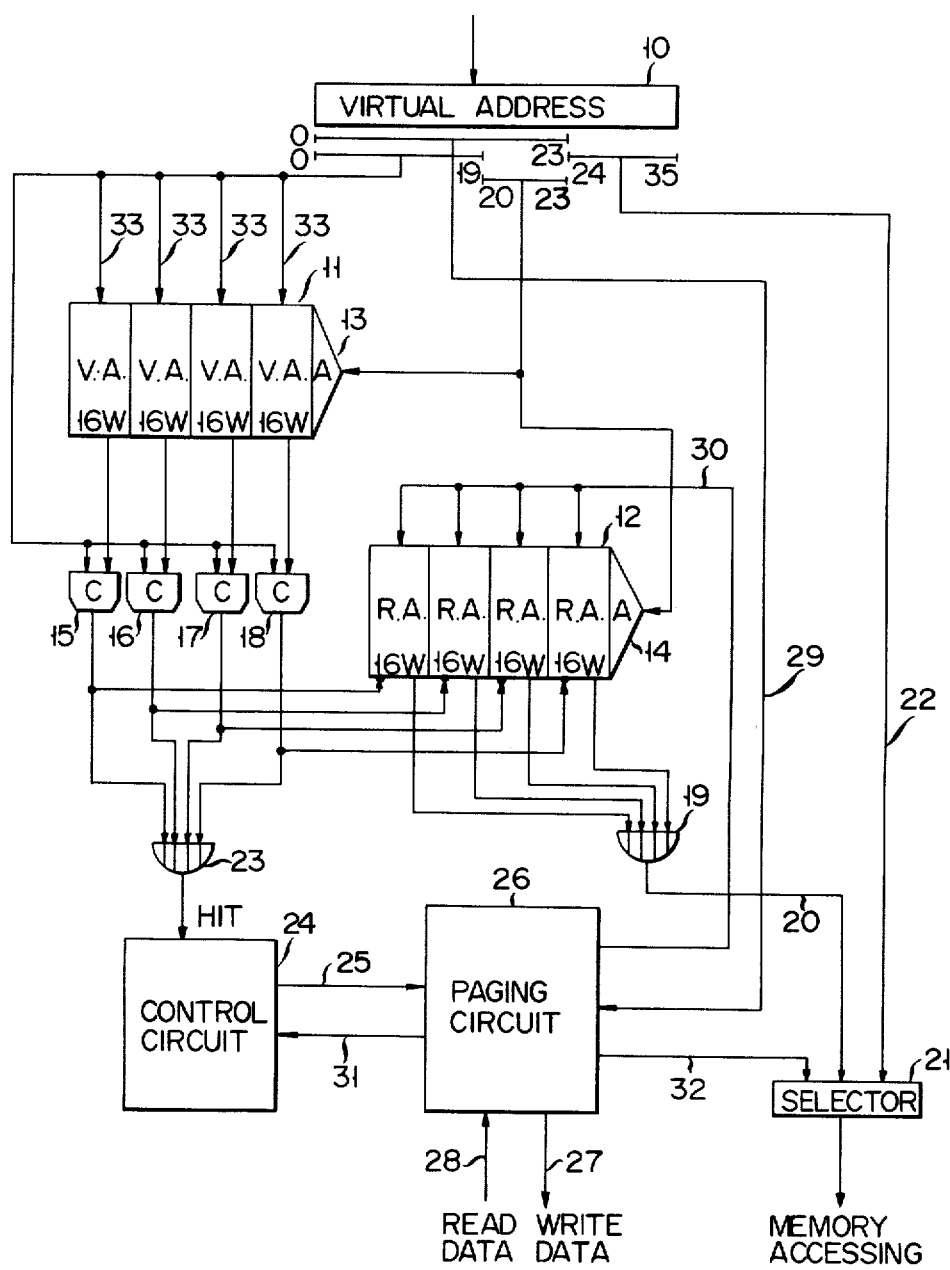
F I G. 2

ADDRESS CONVERSION SYSTEM

This is a continuation of application Ser. No. 119,653, filed Feb. 8, 1980, now abandoned which is a continuation of application Ser. No. 865,584, filed Dec. 18, 1977, now abandoned.

BACKGROUND OF THE INVENTION

The present invention relates to an address conversion system in a data processor for convering a virtual address of a program into a real address in a memory having the program actually located therein when the program is executed.

With progress of recent computer technology, general purpose computers of medium or large scale have frequently been equipped with so-called virtual addressing system in which the address space in the program and the address space used when a main memory is accessed by hardware are separated to facilitate program preparation. The address space for the program is called a virtual address space and the address space for addressing the main memory through hardware is called a real address space. Further, the address in the virtual address space is called a virtual address and the address in the real address space is called a real address. For the computer of the virtual address type, the program is prepared using virtual addresses. When this program is executed, the virtual address is to be converted to the corresponding real address at every main memory access. Due to its frequency, this conversion must be executed very quickly otherwise the conversion deteriorates the performance of the computer. It is the address conversion system that executes this converting function.

The correspondence between virtual and real addresses is generally tabulated in the main memory. The address conversion system, upon receipt of a virtual address, accesses the address conversion table in the main memory to convert the virtual address into the corresponding real address. A high speed memory device of small capacity is usually equipped in the address conversion system to store the correspondence between the virtual and real addresses obtained in this manner. In succeeding address conversions, the correspondence between the virtual and real addresses is read out from the high speed memory so that the address conversion is made at extremely high speed.

In order to realize the latter function of the address conversion system, the high speed memory device is generally constructed as a kind of associative memory and called "address conversion associative memory".

The virtual and real address space is, generally speaking, partitioned into many pages, each of which has a fixed number of bytes, and the correspondence between virtual and real addresses is given on a page basis.

For this, the address conversion system is often called a paging mechanism. In this specification, "a paging circuit" will be used for signifying a circuit to convert the virtual address into the real address through accessing the address conversion table in the main memory, for ease of explanation.

The address actually obtained by the address conversion is only the upper portion of the real address and the lower portion of the real address corresponding to the address in the page is same as the corresponding portion of the virtual address. In this specification, the term "virtual address" will be used to signify either the upper part of the address notation, which is essential to the address conversion, or the whole address notation in the virtual address space, which comprises of the upper part and the lower part mentioned above. This applies also to the term "real address". The upper part of the virtual address notation mentioned above is also called the page number.

FIG. 1 shows a block diagram of one of proposed apparatus for converting the virtual address into the real address. More particularly, the apparatus shown in FIG. 1 is an address conversion system using an associative memory. Memory 1 contains virtual addresses and corresponding real address. The memory 1 holds some pairs of virtual addresses and corresponding real addresses which are used recently. When a virtual address to be converted is given, memory 1 is read to find if the virtual address is in it. The upper portion of the virtual address from the CPU is transferred to the memory 1 through a signal line 2 for obtaining a real address corresponding to the virtual address. The virtual address given from the CPU and the virtual address read out from the memory 1 are transferred to a comparator 3 for comparison. If the virtual address being now searched from the CPU is in the memory 1, the virtual address must be read out from the memory 1 accessed through the address decoder AD which decodes a part of the given virtual address. In this case, the comparator produces a coincidence signal which in turn enables a gate circuit 4 to permit the corresponding real address to be read out from a pair of virtual and real addresses stored in the memory 1. The upper part of the real address read out thus, together with the lower part of the virtual address (same as the lower part of real address) fed through the signal line 5 from the CPU, forms address information for accessing the main memory (not shown).

If the memory 1 does not include the virtual address under search from the CPU, then the memory 1 does not produce the virtual address equal to that fed from the CPU. In this case, the comparator 3 produces a non-coincidence signal to be directed to a control circuit 6. The control circuit, upon receipt of the non-coincidence signal, operates so as to access the main memory, which stores all of the correspondence relationships (corresponding to a known page table) between the virtual addresses and the real addresses. Through this access, the real address corresponding to the virtual address searched from the CPU is read out from the main memory and the virtual and real addresses are loaded into the memory 1. The details of the address conversion referring to the main memory are not described because the conversion using the table in the main memory is not essential to the present invention.

In the above explanation referring to FIG. 1, the number of the virtual and real addresses read out from the memory 1 are each single, for simplicity. In actuality, however, when a virtual address is applied to the memory 1, a plurality (for example, four) of virtual addresses and a plurality of real addresses corresponding to them are read out from the memory 1. Similarly, a plurality of comparators 3 are used to compare a plurality of virtual address read out and the virtual address fed through the line 2. The real address corresponding to the virtual address which is coincident with the given real address is outputted through the gate circuit 4. This is called a set associative system, and is described in detail below.

FIG. 2 shows a block diagram of a more detailed circuit construction of FIG. 1. In FIG. 2, a virtual address as an address control word from the CPU (not shown) is stored in a register 10. In this example, the virtual address stored in the register 10 consists of 0th through 35th bits, and the upper part (0th through 23th bits) of it is to be replaced by the upper part of the corresponding real address. A part (for example, 20th through 23rd bits) of the upper part of the virtual address is used to address memories 11 and 12, each of which has four identical compartments of 16 words each, giving so-called 16×4 logical configuration. Each of the compartments consist of several memory elements of 4 bits×16 words configuration. The memory 11 stores the virtual address and the memory 12 stores the real address corresponding to the virtual address. In the drawing, these memories are illustrated as separate entites: however, these memories may be considered as a single memory for storing the address information including the pairs of real and virtual addresses. In response to the address information, address decoders 13 and 14 access the memories 11 and 12, respectively. Another part, e.g. 0th through 19th bits, of the upper part of the given virtual address is transferred to the comparators 15 to 18 to be compared with the virtual addresses read out from memory 11. If one of the comparators 15 to 18 exhibits a coincidence between the virtual addresses, it is called hit state. This state of hit indicates that the memory 11 stores the virtual address equal to that of the address control word in the register 10. The output signals of the comparators 15 to 18 serve as enable signals to the memory 12 storing the corresponding real addresses. That is, when one of the comparators 15 to 18 produces the coincidence (hit) signal, the corresponding memory 12 is enabled to give the real address corresponding to the coincided virtual address. The output of the memory 12 is applied via OR circuits 19 to the signal lines 20. For addressing the main memory, the real address read out and a part, e.g. 24th through 35th bits, of the virtual address transferred from the CPU are coupled and loaded into the address register (not shown) of the main memory. A selector 21 selects the addresses transferred through the signal lines 20 bearing the real address and signal lines 22 bearing a part of the virtual address and transfers them into the address register of the main memory. As will be described later, the selector 21 may select the address from a paging circuit 26 in other cases.

When none of the comparators 15 to 18 produces an output, i.e. in a nonhit state, the memory 11 storing the virtual addresses does not store the virtual address equal to that of the address control word stored in the register 10. Accordingly, the memory 12 does not have the corresponding real address. Therefore, it is impossible to access the main memory. In this state of nonhit, it is necessary to access the address conversion table in the main memory and to read out the real address corresponding to that virtual address. For this, the nonhit signal from the comparators 15 to 18 are transferred to a control circuit 24 through an AND circuit 23. That is, if the control circiut 24 receives the nonhit signal through the AND circuit 23, it judges occurrence of the nonhit in the comparators 15 to 18. Upon the nonhit condition, the control circuit 24 commands to read out the corresponding portion of the address conversion table in the main memory to a paging circuit 26, through control lines 25. The upper part, e.g. 0th through 23rd bits, of the virtual address to be converted is applied through a signal line 29 to the paging circuit 26, where predetermined address calculation is performed on the basis of this part of the address to produce the corresponding address of the page conversion table. The address is transferred to the main memory via signal lines 32 and the selector 21 to retrieve the data stored therein. Since the address calculation is not essential to the present invention, the description thereof will be omitted. This calculation and data retrieval may have to be repeated one or more times (depending on the construction of the address conversion table) to read out data including the real address corresponding to the given virtual address.

Data read out from the main memory are transferred to the paging circuit 26 via signal lines 28, and the real address is loaded into the memory 12 via signal lines 30. The virtual address in the virtual address register 10 is loaded into the memory 11 by way of the signal lines 33. The loading of the real and virtual addresses into the memories 11 and 12 is controlled by a round robin counter (not shown) for specifying the compartment of the memories 11 and 12 to which these addresses are loaded. Signal lines 27 are used to transfer write data to the main memory, when the address conversion table in the main memory is to be updated. The read data other than the above-mentioned real address information are transferred through control lines 31 to the control circuit 24 for execution of desired control. A part of the other control data (for example, "written bit" of that control data) is written into the memory 12, together with the real address. The details of this will be omitted in description since it is not essential to the present invention.

The address conversion system of the above-mentioned conventional associative memory system by one level suffers from the following disadvantages.

One of the disadvantages is that the address conversion time from application of the virtual address to production of the real address necessarily includes the access time of the memory 1, even if the address conversion associative memory is hit, i.e. even if the time required for the address conversion is minimum. The access time of the memory 1 is generally several to several tens of ns but this is large enough to be significant in a reference clock period (e.g. 300 ns, 100 ns or so). The address conversion system may frequently be located on a signal path which is a critical path for reducing the reference clock period. Therefore, the access time of the memory 1 is one of factors defining the upper limit of the reference clock period of a computer. If the access time of the memory 1 is not included in the address conversion time, the clock period of the computer may be reduced by the access time so that the entire processing time of the computer is possibly improved ten to twenty percent.

Another disadvantage of the conventional address conversion system is that it needs memory elements having a proper scale of integration (for example, 4 bits×16 words). The problem is not serious when technology with a large number of IC families is used. However, when technology with a small number of IC families, for example, only two kinds of memory elements 4 bits×4 words and 2 bits×128 words, are available, the address conversion system realized using them is expensive and of poor performance. For example, when the memory of 16 words as shown in FIG. 2 is to be constructed by using memory elements of 4 bits×4 words, four chips are needed in the word direction so that the chip number of the entire unit is four times. This leads to an expensive and bulky address conversion system and also to elongation of the signal transfer delay.

Alternatively, when 2 bits×128 words memory is used, the access time is elongnated because of the long access time of the memory element which has an unnecessarily large capacity. Accordingly, the time required for the address conversion and thus the reference clock period of the entire computer are elongated, resulting in deterioration of the computer performance.

SUMMARY OF THE INVENTION

Accordingly, an object of the present invention is to provide an address conversion system in which the time of the address conversion is minimum.

Another object of the present invention is to provide a method in which, when memory elements suitable for the address conversion associative memory cannot be obtained, a good address conversion associative memory may be realized by using a suitable combination of substitutional memory elements.

Another object of the present invention is to provide a novel associative memory with improved cost performance ratio designed by taking advantage of the new LSI memory elements.

A still further object of the present invention is to provide an address conversion system capable of reducing the cost of the system by reducing the number of comparators in which only a few comparators are connected to a memory (first memory device) in the address conversion associative memory.

To achieve the above-mentioned objects, a combination of high speed memory elements with small capacity and low speed memory elements with large capacity is used as a high speed memory with large capacity. A similar combination of two memories has well been known as buffer memories, cache memories and memory hierarchy for instruction and operand access. However, the present invention uses the memory combination to obtain an associative memory of which the minimum time required for the address conversion is shorter and the hit rate is high. Further, the memory hierarchy scheme is employed for the address conversion associative memory to attain a cost reduction and high performance.

According to one feature of the present invention, there is provided an address conversion system comprising a first memory for storing pairs of virtual and real addresses and a second memory of which the speed is lower but the capacity is larger than those of the first memory and which stores pairs of corresponding virtual and real addresses. When the first memory has the virtual address which is now searched, it immediately produces the real address corresponding to the virtual address. When the virtual address is not stored in the first memory but stored in the second memory, the virtual address and the corresponding real address are loaded into the first memory and the real address is supplied to the main memory.

When both the first and second memories do not have the virtual address, the address conversion system accesses the main memory which stores all of the pairs of virtual and real addresses. It reads out the real address corresponding to the virtual address being now searched from the main memory and writes the real address and the virtual address under search into the first and second memories. Thus, the most recently used address pair is kept in the first memory to allow fast access, resulting in a succeeding fact address conversion.

In the present invention, the real address corresponding to the virtual address under search is always sent from first memory. Therefore, the construction is simple and the cost is reduced.

The second memory operates as an associative memory of a set associative type; however, it has no comparators circuit for the virtual address but uses the comparator circuit of the first memory. Therefore, the necessary hardware is minimized.

The upper portion of the real address read out from the first memory and a part of the virtual address fed from the CPU are coupled to form a complete real address for accessing the main memory. The read or write operation is executed for the address of the main memory specified by the address information. Data is transferred through the data busses coupled with the main memory and with the CPU. The access to the main memory is well known, so explanation of the details of it is not included in this specification.

BRIEF DESCRIPTION OF THE DRAWINGS

Other objects and features of the present invention will be apparent from the following description taken in connection with the accompanying drawings, in which:

FIG. 2 shows in block form more details of the circuit of a conventional address conversion system;

DETAILED DESCRIPTION OF THE PREFERRED EMBODIMENTS

Figure 3:
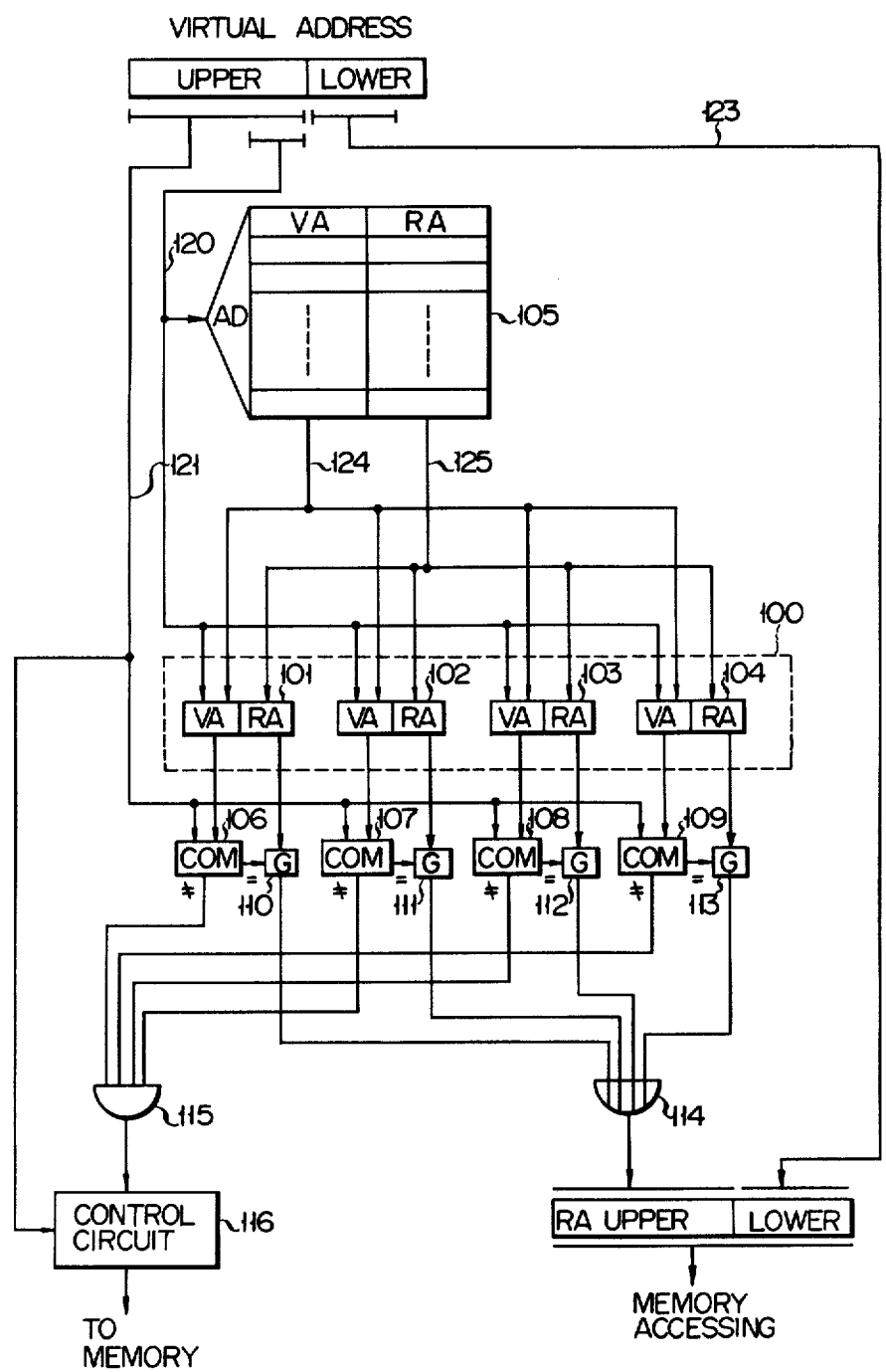
FIG. 3 shows a block diagram of an address conversion system according to the present invention.

In FIG. 3, reference numberal 100 designates a first memory for storing virtual addresses and real addresses corresponding to the former. The first memory 100 is comprised of registers 101 to 104. Reference numeral 105 designates a second memory of which the speed is lower but the capacity is larger than those of the first memory. The second memory 105 stores virtual addresses and real addresses corresponding to the former, including the contents of the first memory. Reference numerals 106 to 109 designate comparators for comparing the virtual address read out from the first memory and the virtual address under search. Gate circuits designated by reference numerals 110 to 113 are enabled by coincident outputs from the comparators 106 to 109, respectively. The real addresses stored in the first memoyr 100 are transferred through the gate circuits 110 to 113 to an OR circuit 114. Non-coincidence signals from the comparators 106 to 109 are applied to an AND circuit 115. The output signals from the AND circuit 115 is transferred to a control circuit 116.

Figure 4:
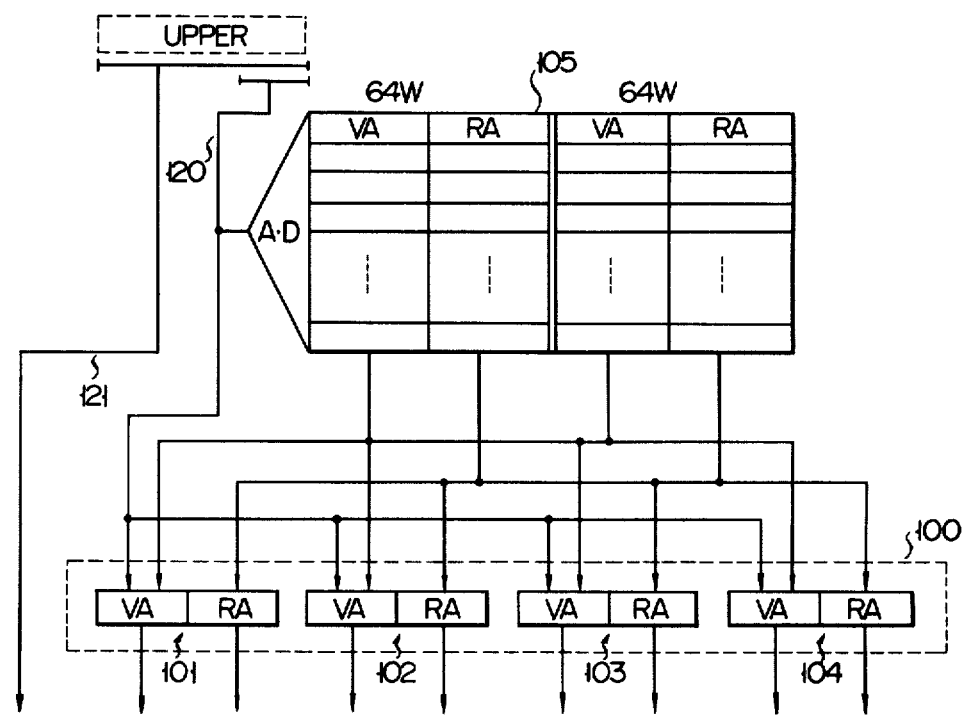
FIG. 4 shows an enlarged view of the first and second memories of the FIG. 3 circuit.

Before proceeding with description of the operation of the address conversion system of the present invention, details of the first and second memories 100 and 105 will be given. FIG. 4 shows further details of the logical structure of the memories in FIG. 3, in which the same reference numerals are used when referencing to the identical parts.

In FIG. 4, the first memory 100 is comprised of four pairs of registers 101 to 104. Each pair of registers stores one word of address information, and thus the first memory has a four words capacity. In each pair of registers one is used for storing the virtual address and the other for storing the real address corresponding to the former. As seen from FIG. 3, the virtual addresses stored in the first memory 100, therefore, are directly compared with the virtual address under search in the respective comparators 106 to 109. Accordingly, interrogation as to whether the virtual address under search is stored in the first memory or not is immediately answered.

Figure 5:
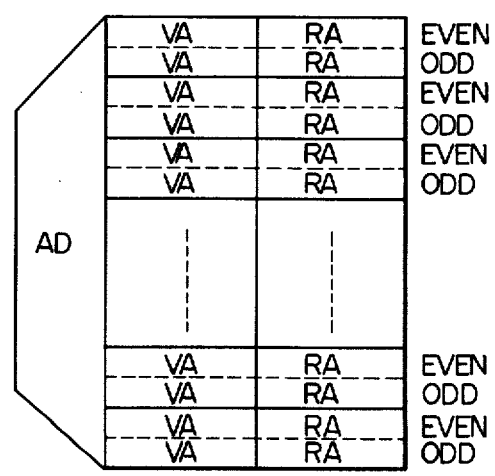
FIG. 5 shows further details of the second memory shown in FIG. 4.

The second memory 105 may be constructed by common and conventional memory elements such as a random access memory (RAM), and has larger capacity than the first memory. The capacity of the second memory 105 in FIG. 4 and FIG. 5 to be described later has physically 128 words, for example, and is realized by using memory elements of 2 bits×128 words. The concept could apply to any size memory. However, this implementation only uses a 128-word capacity for the second memory 105. The second memory is configured to make a so-called set associative memory operating such that the address information of a part of the virtual address fed from the CPU is decoded by an address decoder (AD) to search the desired virtual address. According to the present invention, the second memory is divided logically into two sections for an address of which the logical construction is 64 words×2. The physical construction of the second memory 105 is illustrated in FIG. 5. The second memory 105 operates in a manner such that, upon receipt of the virtual address under search, 64 words in the EVEN side (No. 1) of the same address are accessed and then 64 words in the ODD side (No. 2) of the same address are accessed. The detail of the read-out operation will be described with reference to FIG. 6. As described above, the second memory 105 is larger in capacity but slower in speed than the first memory.

The operation of the address conversion system of the present invention will be described referring to FIG. 3. The virtual address information, including the virtual address under search, is applied to the address decoder (AD) of the second memory 105 through signal lines 120. At the same time it is applied to the first memory 100 through a signal line 121. The address decoder (AD) and the second memory 105 compose a known set associative memory. The virtual addresses stored in the registers 101 to 104 of the first memory 100 are immediately compared with the virtual address under search fed through signal lines 121 by the comparators 106 to 109. When the virtual address under search is stored in the first memory 100, one of the comparators 106 to 109 produces a coincidence (hit) signal. The hit signal enables one of the gate circuits 110 to 113 so that the first memory 100 immediately produces the real address stored therein. The upper portion of the real address thus obtained is coupled with the other address information transferred through the signal lines 123 to form a complete real address for accessing the main memory. The read operation of the second memory 105 has also been initiated in case the virtual address under search is not found in the first memory 100. If the virtual address in question is found in the first memory 100, the coincidence occurs in one of the comparators 106 to 109 so that the AND circuit 115 is not enabled, and the control circuit 116 operable in response to the output of the AND circuit 115 prohibits the strobe to the first memory 100. Thus the contents of the first memory 100 remain unchanged if a hit occurs in the first memory 100. For this, although the virtual address is searched in the second memory 105, the output of the second memory 105 is substantially insignificant in the address conversion.

However, when the virtual address now being searched is not stored in the first memory 100, the read-out from the second memory 105 is significant. In other words, if the virtual address under search is not stored in the first memory 100, the AND circuit 115 operates to transfer a nonhit signal to the control circuit 116. Upon receipt of the nonhit signal, the control circuit 116 transmits a strobe signal to the first memory 100 to write the virtual address and the corresponding real address read out from the second memory 105 into one of the pair of registers 101 to 104 contituting the first memory 100. The selection of the register pairs 101 to 104 is determined by a so-called replacement algorithm. LRU (lease recently used) method and round robin method are well-known as the replacement algorithms. The replacement algorithm is not essential to the present invention and the present invention may be combined with any replacement algorithm.

In this manner the virtual address and the corresponding real address read out from the second memory 105 are written into one of the register pairs constituting the first memory 100, and the virtual address is immediately transferred to the comparator where it is compared with the virtual address under search. If these addresses are coincident, it produces the real address through the gate circuit and the OR circuit 114.

When no coincidence signal is produced through the comparing operation, a nonhit signal is transferred through the AND circuit 115 to the control circuit 116. Then the control circuit 116 issues a strobe signal to write the virtual address and the corresponding real address read out from the second memory 105 into one of the pair registers the first memory 100. As in the previous case, the selection of the pair register is made by the replacement algorithm. The reason why the second memory 105 is read twice is that the second memory 105 is logically divided into two sections, for example, 64 words×2 logical construction is employed for 128 words capacity, as described related to FIGS. 4 and 5. For this, when the second memory is searched, one of 64 words on the EVEN side (No. 1) is first searched, and if the desired virtual address is not found in this side, one of 64 words on the ODD side (No. 2) is then searched. Such a searching operation will be better understood from the timing diagrams shown in FIG. 6.

When the virtual address is found neither in the first nor the second memories 100 and 105, the main memory storing all of the virtual addresses and the corresponding real addresses must be accessed to read out the real address corresponding to the virtual address now being searched therefrom and then to write the real address into the first and second memories 100 and 105. This operation is executed through the control circuit 116. More specifically, if the desired virtual address is not found in the first and second memories, all of the comparators 106 to 109 produce non-coincidence (nonhit) signals which are transferred to the control circuit 116 through the AND circuit 115. The virtual address information is transferred to the control circuit 116 through the signal lines 121. In response to the third non-coincidence (nonhit) signal from the AND circuit 115 and the virtual address information through the signal lines 121, the control circuit 116 operates to execute an access to the main memory.

The operation mentioned above will be described with reference to the timing diagrams shown in FIG. 6.

Figure 6:
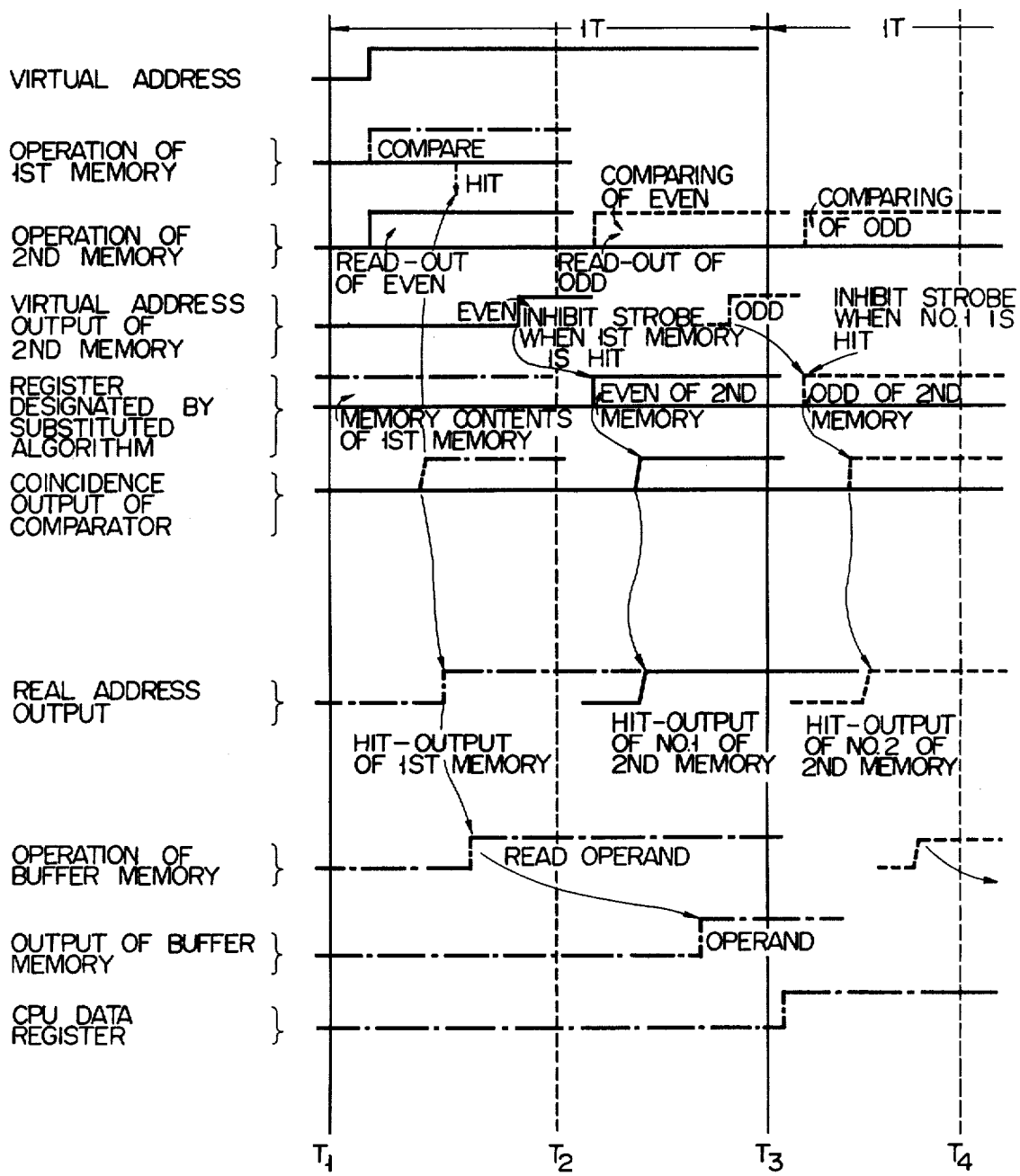
FIG. 6 shows a set of timing diagrams useful in explaining the operaiton of the address conversion system according to the present invention.

The reference clock period of the CPU in this embodiment is 1T in FIG. 6, and the CPU operates on the basis of the reference clock. The associative memory for address conversion of the present invention is logically and physically small in size so that one unit of operation may be completed in a shorter time, compared to the unit of operation executed by the CPU. The address conversion associative memory of the present invention operates based on the half clocks $T_1$, $T_2$, $T_3$, $T_4$... operating at a speed two times the reference clock of the CPU. The virtual address sent from the CPU to be converted is set in the virtual address register at the timing of the reference clock and the output signals of the register become valid at the timing denoted as virtual address in FIG. 6. In other words, the address to be converted is transferred to the comparators 106 to 109 connected to the first memory 100 and addresses the second memory 105, very early within the reference clock period. At this time the control circuit produces logical zero "0" onto an EVEN/ODD selection line (see 230 in FIG. 7) and set the least significant bit of the address of the second memory 105 to "0" to select the EVEN side of the second memory 105 while the given virtual address is compared with the virtual addresses in the first memory 100 by the comparators 106 to 109. In the second memory 105, the EVEN side of the two words, which have the possibility of being the given virtual address, is read out. In the read-out operation from the second memory 105, the virtual address of the EVEN side and the corresponding real address are read out near the end of the first half clock, and the virtual and the corresponding real addresses are transferred as write data to the input of the first memory 100. If one of the comparators 106 to 109 generates a coincidence signal, the output of the register storing the real address corresponding to the virtual address is enabled and the real address stored there is supplied through the OR circuit 114. For reference, the succeeding operation of the CPU will be referred to. In response to the real address output, the CPU accesses a buffer memory and loads the operand register with an operand read out from the buffer memory at the end (i.e., $T_3$) of the reference clock period of the CPU, thereby completing all the jobs scheduled within the reference clock period.

In the address comparing operation, if no coincidence signal is generated, the real address is not saved in one of the output registers provided, during the first half clock period ($T_1$–$T_2$). Therefore, during the first half clock period, the CPU cannot initiate an access of the buffer memory and thus fails to obtain the required operand at the end of the CPU reference clock. For this, when there is no address coincidence signal during the first half clock period, the address conversion system transfers clock control signals to the CPU during 1T reference clock period to place the CPU to be in waiting condition. More specifically, the non-coincident signal from the comparator is applied through an AND circuit to a D-type flip-flop which is strobed at times $T_2$ and $T_4$, and when the flip-flop is set the CPU is locked. This locking operation of the CPU is convenient since the above-mentioned circuit may be used for the following operation without any modification.

Following is an explanation of the operation of the address conversion system during the second half clock period ($T_2$–$T_3$) and succeeding periods. Before describing the operation, the explanation of the timing diagrams in FIG. 6 will be first done. The operation of the address conversion associative memory in this example embodiment of the present invention is different depending on four cases of first and second memories; where the first or second memory (EVEN/ODD side) has a hit or a miss. FIG. 6 illustrates these cases on a place, by using solid, broken, and chain lines for discriminating these cases, although discrimination by these lines is not strict. However, the following description will supplement the insufficient depiction of the drawing.

The explanation to follow is on the operation of the address conversion system at time $T_2$ of the half clock. If the address comparison during the first half clock period ($T_1$ to $T_2$) produces no coincidence signal, the virtual address corresponding to the applied virtual address and the corresponding real address are not stored in the first memory 100. For this, at completion of the address conversion, one of the register pairs selected by the replacement algorithm is to be loaded with the given virtual address and the corresponding real address, replacing current contents of the register pair. Therefore, when no hit occurs in the first memory, information currently stored in the register pair selected by the replacement algorithm can be destroyed. That is, when the first memory 100 produces no address coincidence signal, the selected register pair may be used as a working register. Therefore, in this example, at time $T_2$ and succeeding time, the selected register pair also operates as a buffer register to the output signal of the second memory 105. In other words, if no address coincidence signal is generated during the first half clock period, the virtual address and corresponding real address read out in the period from the second memory 105 are loaded into the register pair selected by the replacement algorithm at time $T_2$. During the second half clock period ($T_2$ to $T_3$), the address comparator connected to the register pair compares the virtual address read out from the EVEN side of the second memory 105 with the virtual address supplied by the CPU. When the address coincidence signal is produced during the first clock period ($T_1$ to $T_2$), writing into the register pair selected by the replacement algorithm is inhibited and the contents of the first memory 100 remains unchanged. The real address obtained through the address coincidence also remains unchanged giving correct real address in the second half clock period ($T_2$–$T_3$), as in the first half clock.

At time $T_2$, the control circuit activates the selection line of EVEN/ODD of the second memory 105 (see 230 in FIG. 7) to be "1". As a result, during the second half clock period ($T_2$–$T_3$), read-out from the ODD side of the second memory 105 is performed in parallel.

In this manner, during the second half clock period ($T_2$–$T_3$), read-out from the ODD side of the second memory 105 is simultaneous with the comparison of the virtual address read out from the EVEN side of the second memory 105 with the virtual address applied. When the comparing operation produces a coincidence signal, the register storing the corresponding real address (this real address was read out from the EVEN side of the second memory and stored in the real address register of this register pair at time $T_2$) is enabled to produce the real address. Further, when the coincidence output is generated, writing into the first memory 100 at time $T_3$ is inhibited so that, as in the previous case, the pair of the virtual address retrieved from the EVEN side of the second memory and the corresponding real address remains set in the register pair of the first memory 100. That is, the virtual address applied and the corresponding real address has been written into the register pair of the first memory 100 selected by the replacement algorithm.

During the second half clock period ($T_2$–$T_3$), when no coincidence signal is generated, the output of the second memory 105 is rewritten into the register pair selected by the replacement algorithm at time $T_3$. The implementation of the replacement algorithm must be such that if no coincidence signal is generated, the selection of the register pair remains unchanged during this operation to overwrite the unused virtual real address pair which is written in the register pair at the first half clock period ($T_1$–$T_2$)

If no address coincidence signal is generated during the second half clock period ($T_2$–$T_3$), the virtual address retrieved from the ODD side of the second memory 105 is written in the selected register pair at $T_3$ and compared with the virtual address applied during the third half clock period ($T_3$–$T_4$). In this comparison, if the coincidence of the address is obtained, the corresponding real address, which has been set in the register pair selected by the replacement algorithm in the first memory 100, is enabled and read out from the register and is applied through the OR circuit 114.

During the clock $T_4$, the flip-flop for generating the signal to lock the CPU is triggered. If a hit has occurred between $T_2$ and $T_4$ the output of the AND circuit 115 is "0" so that the flip-flop is reset to release the locking of the CPU. The operand is read out from the buffer memory, according to the real address obtained during the third half clock period ($T_3$–$T_4$), and is loaded into the operand register of the CPU at time $T_5$. In FIG. 6, the clock $T_5$ is not shown but it is a half clock period after the clock $T_4$. In this embodiment, the CPU operation is based on the reference clock (not on the half clock), so the CPU Is locked during one clock period regardless whether the hit occurred at the EVEN side or the ODD side of the second memory 105.

If the third half clock period ($T_3$–$T_4$) produces no address coincidence signal, i.e., if the first and second memories 100 and 105 do not have the virtual address corresponding to the virtual address applied, the real address is not produced. Thus, the CPU is in a condition such that it cannot restart its operation and continues waiting. When the D-type flip-flop for producing the signal to lock the CPU is strobed at time $T_4$, the AND output of the non-coincidence signal is "1" so that the flip-flop continues its set state after the clock $T_4$. In this manner, the CPU is kept waiting. And the control circuit starts to access the address conversion table stored in the main memory. The succeeding operation is the same as that of the conventional address conversion. Therefore, its explanation is omitted.

Figure 7:
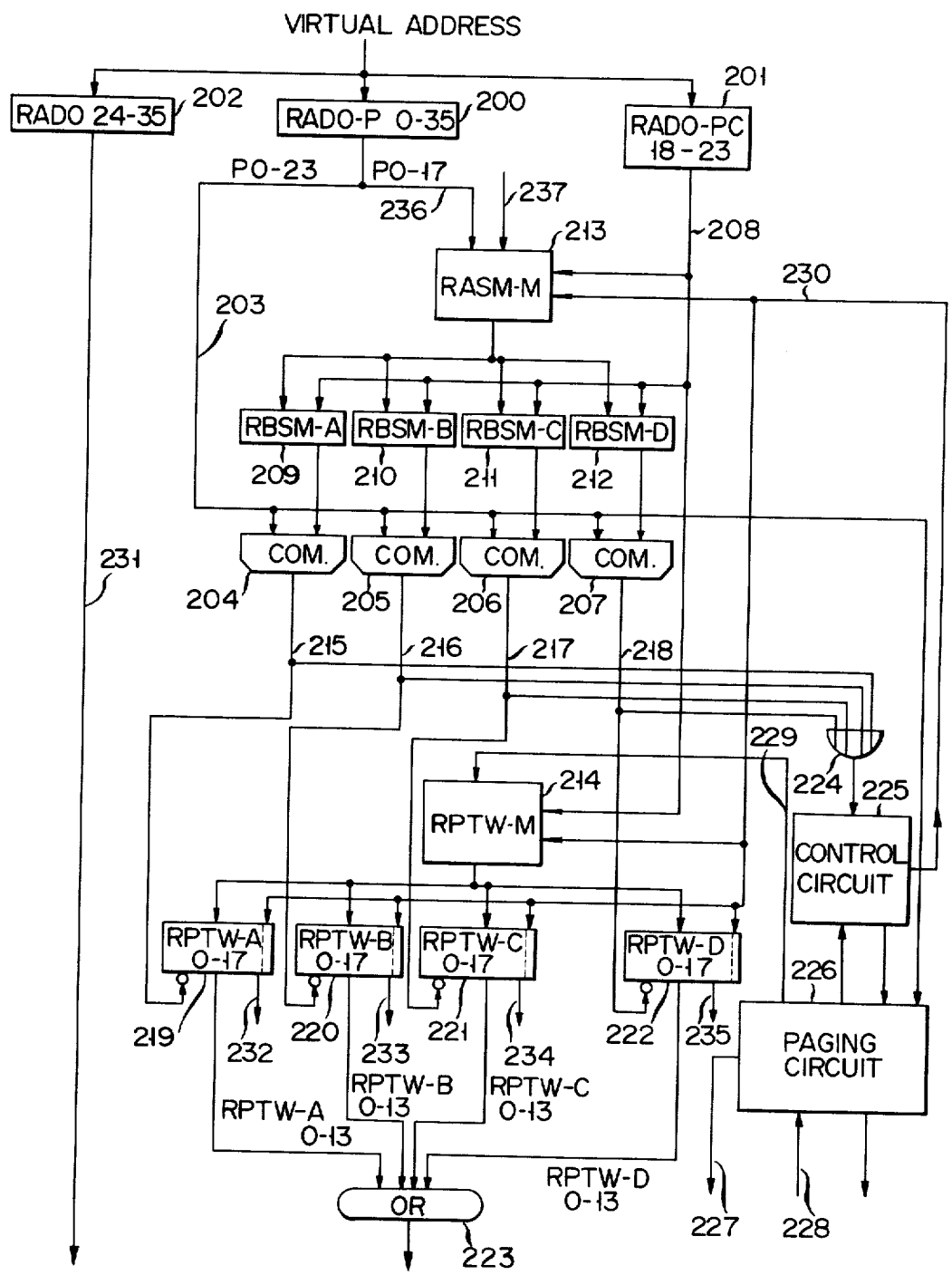
FIG. 7 shows a block diagram of an embodiment of an address conversion system according to the present invention.

An embodiment of the present invention will be given with reference to FIG. 7. In the embodiment shown in FIG. 7, a register $\overline{RADO}$-P 200, a register $\overline{RADO}$-PC 201 and a register $\overline{RADO}$ 202 are used for setting the virtual address to be searched. The register $\overline{RADO}$-PC 201 is designed to operate as a counter and used to facilitate the clearing of the associative memory. When the contents of the associative memory are to be cleared, the register RADO-PC acts as a counter whose contents is incremented one by one and which clears the entry data in RASM-M 213. This clearing operation is an operation which is not directly related to the present invention. As far as it concerns the present invention, the register RADO-PC 201 may have the same construction as that of the register $\overline{RADO}$-P 200. 0th through 23rd bits of the virtual address set in the register 200 are transferred through signal lines 203 to the comparators 204 to 207. 18th through 23rd bits of the virtual address stored in the register 201 are transferred through signal lines 208 to the memory RASM-M 213 storing the virtual address and to the memory RPTW-M 214 storing the real address. These memories compose the second memory. 18th through 23rd bits transferred to these memories are used for addressing the memories 213, 214 operating as a set associative memory. These section bits are also supplied to registers RBSM-A 209, RBSM-B 210, RBSM-C 211 and RBSM-D 212 for storing the virtual addresses of the first memory. A selection signal is applied to the second memories 213 and 214 through a selection line 230 from the control circuit 225. By using this selection signal, the second memories are so controlled that the EVEN sides (No. 1) are initially selected. The selection signal gives the least significant bit of the address signal to the memory chip constituting the second memory 213 or 214. When the virtual address under search is found in the first memory, one of the comparators 204 to 207 produces a coincidence (hit) signal. The coincidence signals from the comparators 204 to 207 are applied to registers RPTW-A 219, RPTW-B 220, RPTW-C 221 and RPTW-D 222 storing the real addresses and composing the first memory, through signal lines 215, 216, 217 and 218. The coincidence output signals of the comparators 204 to 207 are also applied to the control circuit 225 through an OR circuit 224. When one of the comparators 204 to 207 produces a coincidence signal, the control circuit 225 operates so as to inhibit the virtual address and the corresponding real address read out from the second memories 213 and 214 from being written into the first memories 209 to 212 and 219 to 222. In the drawing, inhibit lines are not illustrated for simplicity, which connect the control circuit 225 to the first memories 209 to 219 and 219 to 222. With such a connection, when one of the comparators 204 to 207 indicates a match, the corresponding register of these 219 to 222 produces the real address (0th through 13th bits) which goes through an OR circuit 223. The real address is coupled with the address transferred through a signal line 231 from the register 202 to form a real address for the main memory addressing. When the virtual address being searched is found in the level of the first memory, the contents of the first memory remain unchanged. Further, since the address conversion in the level of the first memory is completed in the minimum time, the control circuit 225 does not lock the CPU. In this manner, the address conversion is completed by only using the first memory.

When there is no hit condition at time $T_2$ in FIG. 6 (comparators 204 to 207 do not produce a signal), then the control circuit 225 locks the CPU for at least one clock period. When nonhit occurs at time $T_2$ in FIG. 6, this corresponds to the case where the first memory is not hit and none of the comparators 204 to 207 produces an output signal so that the control circuit 225 locks the CPU for one clock period to search the second memory 213. As described relating to the timing diagrams of FIG. 6, the access of the first memory is performed in parallel with the reading operation to the corresponding word of the 64 ones at the EVEN side No. 1 of the second memory 213. And the virtual address being searched in the second memories 213 and 214 is written into one of the registers 209 to 212 for storing the virtual addresses of the first memory, while the real address corresponding to the virtual address, is loaded into the register paired with the register selected for the virtual address (the former register being one of the registers 219 to 222 used for storing the real addresses of the first memory).

The position designation in the writing operation is performed by the replacement algorithm. This example employs the round robin method as the replacement algorithm and thus it is controlled by a two-bit counter, and is well-known. In the two-bit counter, during every wite operation period into the first memory, a step-up operation is performed so as to designate the position of the register storing the oldest standing virtual address and the real address corresponding to the former. However, when the virtual address stored in the register designated by the counter is hit, the pair of the virtual and real addresses stored in the register pair is oldest but most recently used, which means there is a high possibility that this address pair may be used later. Accordingly, when a hit occurs at the register pair designated by the two-bit round robin counter, the round robin counter is counted up which constitutes a decisive difference from the common round robin counter.

Additionally, the virtual address (0 to 17 bits) read out from the second memory 213 and the virtual address (18 to 23 bits) used for addressing the second memory 213 are both loaded into the first memory (one of registers 209 to 212). Since the second memory 213 is configured as a set associative memory, the virtual address 18 to 23 bits used for the second memory 213 addressing is not stored the second memory 213 to eliminate redundancy. On the other hand, the first memory is configured as a complete associative memory (all the virtual addresses 0 to 23 bits relating to the address conversion must be stored in the first memory).

The comparing operation and the output operation after address information transfer from the first memory to the second memory is completed, is as already described. A similar operation is performed on the 64 words of the ODD side No. 2 of the second memory, and elaboration of it will be omitted. The operation of it will be better understood from the timing diagrams shown in FIG. 6.

When the virtual address is not searched in the first and second memories, the main memory is searched to produce the corresponding real address. Then, the real address read out and the corresponding virtual address are loaded into the first and second memories. The operation of this will be described below.

If none of the comparators 204 to 207 generates hit signal, the OR circuit 224 does not activate its output signal. The output of the OR circuit 224 is coupled with the control circuit 225 and the signal from the OR circuit 224 is not turned on at time $T_4$ of FIG. 6. The control circuit detects this and recognizes that the second memory also does not have the virtual address under search. Then, the control circuit 225 operates the paging circuit 226 to search the address conversion table stored in the main memory, while locking the CPU. Given the virtual address from the signal lines 203, the paging circuit 226 executes a given address operation and accesses the required item in the address conversion table in the main memory through the signal lines 227. The real address read out from the main address is loaded into the second memory 214 storing the real address, through the signal lines 228, the paging circuit 226 and the signal lines 229. At this time, the writing position is specified by 18 to 23 bits in the virtual address and the round robin counter for the second memory. In other words, at this time, the EVEN/ODD selection line of the second memory is controlled by the round robin counter for the second memory. The memory has a logical construction of 64 words $\times$ 2. Accordingly, 64 one-bit counters will suffice for the round robin counter. In this example, this is realized by using a part of a 2 bits $\times$ 128 words memory element. At the same time as the aforementioned real address storing operation, 0 to 17 bits of the virtual address is transferred from the register 200 to the memory 213, through signal lines 236 and they are written in the memory location in the memory 213 designated by bit 18–23 of the given virtual address and the round robin counter for the second memory. Then, the virtual address is loaded into one of the registers 209 to 212 and the real address is loaded into one of the registers 219 to 222. The writing operation is performed in the same way as address information is transferred from the second memory to the first memory when nonhit is made in the first memory.

Each of the memory 213 and registers 209 to 212 has a validity flag in addition to the virtual address. The validity flag is set to "1" when a valid virtual real address pair is stored there and is reset to "0" when the associative memory is cleared. This validity information is generated by the control circuit 225 and transferred to the memory 213 through a signal line 237, only a part of which is shown on the FIG. 7 for conciseness. Because the validity flag is well known, details need not be described here.

Figure 1:
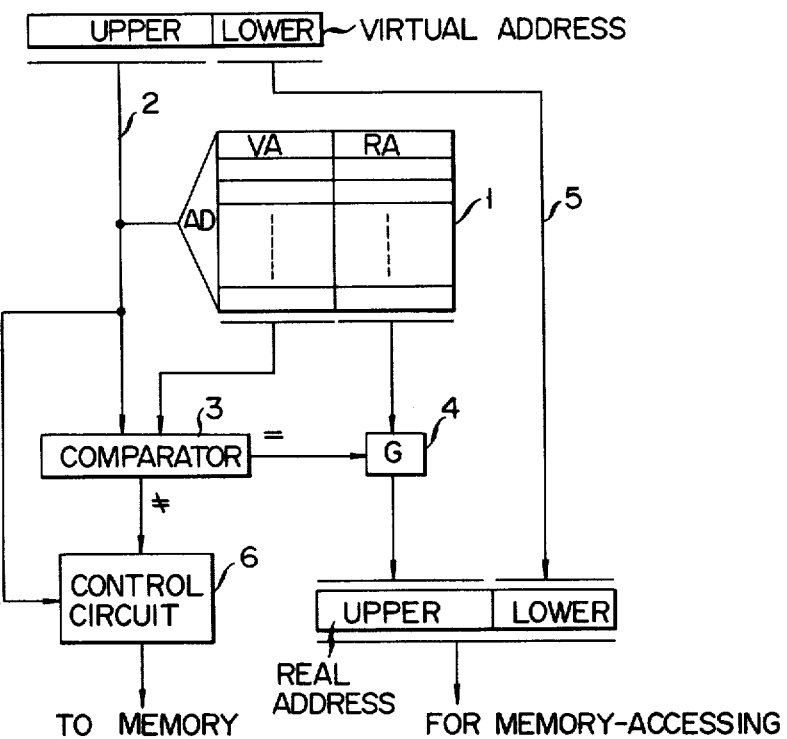
FIG. 1 shows a block diagram of a conventional address conversion system.
Figure 8:
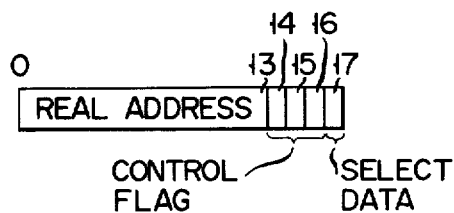
FIG. 8 shows an enlarged view of one of the registers for storing the real address according to the present invention.

Each of the registers 219 to 222 has some control flags and selection information of the second memory 214, in addition to the real address. FIG. 8 shows an enlargement of one of the registers. As seen from the figure, the register consists of 18 bits; 0 to 13 bits for the real address, 14 to 16 bits for the control flags and the 17th bit for the selection information of the second memory. The real address is sent to the OR circuit 223, as shown in FIG. 7, and the control information of the control flag and the selection information are transferred to the control circuit 225, through signal lines 232, 233, 234 and 235 (the transfer paths are not shown), to effect a desired control. The control flags include, for example, a flag indicating a write to the corresponding page, known as the "written bit". The selection information indicates whether EVEN or ODD of the second memory stores the virtual real address pair. As shown in FIG. 5, the second memory 213 or 214 has two different virtual and real addresses on the EVEN and ODD sides. The selection information indicates the ODD side or the EVEN side of the address of the second memory from which the real address is read out. The necessity of the selection information will be given below.

Suppose that the CPU issues a write command with a virtual address. The corresponding real address and the control flags are read out, and "written bit" in the control flags is zero. This means that this page has not been written and that this is the first write operation for that page. For this, it is necessary to set the "written bit" in the corresponding item in the address conversion table (in the main memory) and in the page conversion associative memory. The way to set the written bit in the address conversion table in the main memory is just the same as the conventional one, and no explanation will be given. The pair of the virtual and real address including the updated "written bit" must be loaded also into the first and second memories, replacing the old corresponding virtual real address pair. The selection information indicates whether EVEN or ODD side of the second memory has (or had) the old corresponding pair and into which of the EVEN and ODD the virtual and real addresses pair with the updated "written bit" is to be written. Therefore, the updated "written bit," the real address and the other control flags are transferred from the paging circuit 226 to the second memory 214 through the signal line 229 and written into the memory location designated by the bits 18–23 and the selection line 230, which is controlled by the control circuit 225 to be the same as the selection information bit in the control flags. Then this address pair with updated "written bit" is read out from memories 213 and 214 and stored in the register pair where a "hit" has occurred, replacing the old address pair with the unupdated "written bit".

If the EVEN/ODD selection information is not stored in the first memory, the above case requires reading out the EVEN/ODD from the second memory again to check to see which sides of EVEN or ODD includes the corresponding virtual address. Therefore, with the EVEN/ODD selection information stored in the first memory, such a procedure is eliminated. Assume now that the above-mentioned updating is performed by using the round robin counter of the second memory, without checking which side of EVEN or ODD of the second memory stores the original virtual and real address pair. In this case, the virtual and real address pair, before updating, possibly remains in the address conversion associative memory. More adversely, there is a possibility that two pairs of virtual and real addresses exist corresponding to a single virtual address, which will cause problems later.

The effects attained by the address converson embodying the present invention will be briefly summarized below.

The minimum time required for the address conversion is shortened to enable the reference clock period of the CPU to be shortened. This improves the processing time of the CPU by possibly 10 to 20%. In the conventional technology, the address conversion associative memory is realized by using, for example, 16 word memory elements. On the other hand, the present invention realizes the first memory by using one word memory, i.e. a register, as described in the embodiment.

For clear understanding of the chip saving by the present invention, let us consider a case of an address conversion associative memory using a technology including as the IC family 8-bit registers, 4 bits×4 words memory elements, and 2 bits×128 word memory elements. With the conventional way to implement an associative memory, if an N-bit memory of 16 words×4 is to be fabricated using this IC family, the necessary chip number if $(N \times 16 \times 4) / (4 \times 4) = 4N$ using the $4 \times 4$ memory elements. On the other hand, the present invention needs N/8 chip for the first memory, and $(N \times 64 \times 2) \div (128 \times 2) = N/2$ chip for the second memory, i.e. a total of ⅝ N chip. The comparators need the same amount of hardware for either the conventional associative memory or the present invention. The control circuit for the present invention needs more hardware than the conventional one, but the increased amount of the hardward of the control circuit is considerably less than the reduced number of memory elements. Further, when the associative memory is made of 2 bits×128 word memory elements in the conventional manner, since the read-out time of the memory of 16 words is long, the minimum address conversion time becomes long. For this, it necessitates elongation of the reference clock period, thus deteriorating the performance of the CPU. According to this invention about a 20% improvement in performance is obtained over the 128-word associative memory. With respect to chip number, the memory must be constructed by a 128 word×2 construction to allow simultaneously read out of the two pairs of virtual and real addresses because quick read out is mandatory. It cannot be the same configuration as the second memory of the invention in which two pairs of virtual and real addresses for the corresponding virtual address are stored in two locations, EVEN and ODD, of the same memory, and these are successively read out. Therefore, the memory scheme needs $(N \times 128 \times 2) \div (128 \times 2) = N$ chip. Consequently, when comparing with the memory, i.e. the associative memory constructed by using the memory elements of 2 bits×128 words, the address conversion associative memory of the present invention has a lower cost.

According to the present invention only one comparator is provided in the first memory device and a cost can be reduced over the conventional address conversion system necessitating many comparators.

Figure 9:
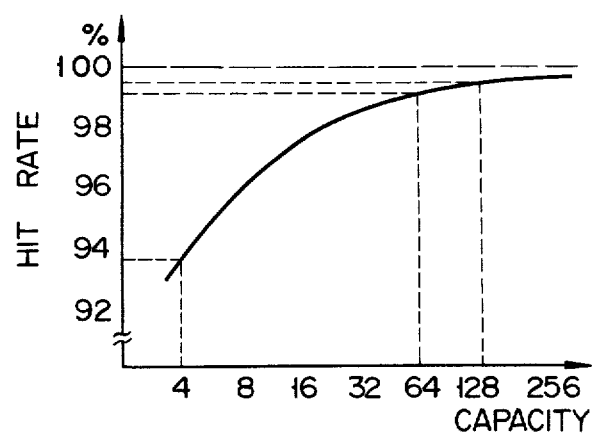
FIG. 9 shows a graph illustrating the relationship of hit rate of capacity for an address conversion associative memory.

Explanation will be given about an average address conversion rate (i.e. taking into account the hit ratio) of the address conversion system. The hit ratio of the address conversion associative memory as well as that of the buffer memory (cache memory), depends largely on the nature of the program executed by the computer. Therefore, it is difficult to strictly evaluate the hit ratio performance. However, an evaluation of this will be given below with reference to FIG. 9. The relation of hit ratio to capacity of an associative memory graphed in FIG. 9, is obtained by simulating the data collected through tracing a large number of programs.

First, let us have the average address conversion time of a conventional associative memory with 64-word capacity. Assume now that when and if nonhit occurs in the associative memory, the CPU is locked and delayed for 20 clock periods while referring to the address conversion table in the main memory. If it hits in the associative memory, the CPU is not locked at all. As seen from FIG. 9, the hit ratio for 64-word capacity is substantially 99%. Accordingly the average delay time due to the address conversion per access is $0T \times 0.99 + 20T \times 0.01 = 0.2T$.

Then let us have the average address conversion time of the embodiment of the present invention. As seen from FIG. 9, the hit ratio for the first memory of 4 words is 94% and, in this case, the delay time of the CPU is zero. The hit ratio for the second memory of 128 words is 99.5%. The difference of the hit ratios for the first and second memories is 5.5%, and this is the probability of the event of that a hit occurs not in the first memory but in the second memory. In this case, the CPU is locked for one clock period. The possibility of the second memory nonhit is 0.5%, and in this case, the CPU is locked for 20 clock periods. Therefore, the average address conversion time is $0T \times 0.94 + 1T \times 0.55 + 20T \times 0.005 = 0.155T$. Consequently, the average address conversion time of the present invention is superior to the conventional one. As described above, the hit ratio depends largely on the program used, and thus there is a variation in the graphs related to the programs. Therefore, the above-mentioned conclusion of the hit rate is not always true. So, it may be considered that there is no significant difference of the hit ratio between the present invention and the conventional system.

Another advantage resulting from the reduction of the minimum time for the address conversion is that the job which is divided into two steps in the conventional system may be done in one step in the present invention. More specifically, the sum of the time required for converting the virtual address to the real address and the time for reading out the operand from the buffer memory according to the real address converted exceeds slightly one reference clock time. It is for this reason that the job must be executed by two steps. On the other hand the address conversion system of the present invention may execute the job in one step. This results in the reduction of stage numbers of the pipe line for checking the operand by one stage and thus a cost reduction.

What is claimed as new and desired to be secured by Letters Patent of the United States is:

1. An address conversion system comprising:

a first memory for storing a first plurality of virtual-real address pairs stored in a main memory, said first memory including a plurality of register pairs each of which includes a first register for storing a virtual address and a second register for storing a real address corresponding to said virtual address;

a second memory having a plurality of memory locations for storing a second plurality of virtual-real address pairs stored in said main memory, the memory capacity of said second memory being greater than that of said first memory;

a plurality of address comparators coupled to the respective first registers, for comparing said virtual addresses stored in said first registers with a part of virtual addresses to be supplied from a central processing unit;

first searching means for determining if said virtual addresses stored in said first registers coincide with said part of said virtual addresses from said central processing unit by using said address comparators when receiving said part of said virtual addresses from said central processing unit;

addressing means for addressing said memory locations of said second memory in accordance with said part of said virtual addresses from said central processing unit at the same time that said first searching means searches said virtual addresses of said first memory;

second searching means for, when said address comparators generate signals indicating non-coincidence and said addressing means reads out said virtual-real address pairs from said second memory, writing said virtual-real address pairs of said second memory into the corresponding first and second registers and for determining if said virtual addresses stored in said first registers coincide with said part of said virtual addresses from said central processing unit by using said address comparators; and main memory access means for accessing virtual-real address pairs stored in said main memory when said address comparators generate signals indicating non-coincidence.

2. An address conversion system according to claim 1, further comprising means for reading out the real address stored in one of said second registers which corresponds to that of said first registers which is connected to said one of said address comparators which one of said address comparators generates coincident signal, whereby an operand from said main memory is read out in accordance with address information which includes said real address read from said one of said second registers and the other part of said virtual addresses supplied from said central processing unit.

3. An address conversion system according to claim 1, wherein said main memory access means reads virtual-real address pairs from said main memory and writes said virtual-real address pairs of said main memory into said memory locations of said second memory and then writes said virtual-real address pairs of said main memory into the corresponding first and second registers.

* * * * *